United States Patent
Uejima et al.

(10) Patent No.: US 9,960,898 B2
(45) Date of Patent: May 1, 2018

(54) RADIO FREQUENCY FRONT-END CIRCUIT

(71) Applicant: Murata Manufacturing Co., Ltd., Nagaokakyo-shi, Kyoto-fu (JP)

(72) Inventors: Takanori Uejima, Nagaokakyo (JP); Hiromichi Kitajima, Nagaokakyo (JP); Saneaki Ariumi, Nagaokakyo (JP); Hisao Hayafuji, Nagaokakyo (JP); Tatsuya Tsujiguchi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days. days.

(21) Appl. No.: 15/235,295

(22) Filed: Aug. 12, 2016

(65) Prior Publication Data

US 2016/0352494 A1 Dec. 1, 2016

Related U.S. Application Data

(63) Continuation of application No. PCT/JP2015/053466, filed on Feb. 9, 2015.

(30) Foreign Application Priority Data

Feb. 19, 2014 (JP) .................................. 2014-029839

(51) Int. Cl.
*H04B 1/10* (2006.01)
*H03K 5/01* (2006.01)
(Continued)

(52) U.S. Cl.
CPC ............. *H04L 5/12* (2013.01); *H04B 1/0458* (2013.01); *H04B 1/18* (2013.01); *H04B 1/52* (2013.01); *H04L 5/10* (2013.01)

(58) Field of Classification Search
USPC ..... 375/219, 220, 222, 240, 240.26, 240.27, 375/256, 259, 267, 284, 285, 295, 297, (Continued)

(56) References Cited

U.S. PATENT DOCUMENTS 4,021,842 A * 5/1977 Campioni ............ H04N 11/165
348/493
5,309,124 A * 5/1994 Cazaux .................. H03H 11/20
333/139
(Continued)

FOREIGN PATENT DOCUMENTS

DE  699 29 534 T2  12/2006
JP  4-10718 A  1/1992
(Continued)

OTHER PUBLICATIONS

Maxim Integrated, Impedance Matching and the Smith Chart: The Fundamentals, Jul. 22, 2002, Maxim Integrated Products Inc, www.maximintegrated.com/en/app-notes/index.mvp/id/742, pp. 1-19.*

(Continued)

*Primary Examiner* — Linda Wong
(74) *Attorney, Agent, or Firm* — Keating & Bennett, LLP

(57) ABSTRACT

A radio frequency front-end circuit includes a duplexer, a phase adjustment circuit, and a low noise amplifier. The phase adjustment circuit is connected between an Rx filter of the duplexer and the low noise amplifier. The phase adjustment circuit executes phase adjustment such that a quadrant in which an impedance ZLNA(fn) at a particular frequency different from a fundamental frequency of a reception signal when looking at the low noise amplifier side from the Rx filter is present and a quadrant in which an impedance ZRX(fn) at the particular frequency when looking at the Rx filter side from the low noise amplifier is present are not in a conjugate relation in terms of phase.

12 Claims, 4 Drawing Sheets

(51) Int. Cl.
*H04L 1/00* (2006.01)
*H04B 1/38* (2015.01)
*H04L 5/12* (2006.01)
*H04B 1/52* (2015.01)
*H04B 1/04* (2006.01)
*H04B 1/18* (2006.01)
*H04L 5/10* (2006.01)

(58) Field of Classification Search
USPC ....... 375/299, 316, 324, 328, 340, 345, 346, 375/347, 350, 349, 362
See application file for complete search history.

(56) References Cited

U.S. PATENT DOCUMENTS

| | | | | |
|---|---|---|---|---|
| 5,926,466 | A * | 7/1999 | Ishida | H01P 1/20345 370/280 |
| 6,472,952 | B1 * | 10/2002 | Sakai | H04B 1/18 333/126 |
| 6,552,634 | B1 * | 4/2003 | Raab | H03F 1/0205 330/124 R |
| 6,998,912 | B2 * | 2/2006 | Kushitani | H04B 1/44 330/51 |
| 8,565,695 | B2 * | 10/2013 | Bonnet | H01P 5/18 333/17.3 |
| 8,730,786 | B2 * | 5/2014 | Wang | H03F 1/304 370/201 |
| 8,773,324 | B2 * | 7/2014 | Ozden | H01Q 1/242 343/850 |
| 2005/0077980 | A1 * | 4/2005 | Watanabe | H01P 1/15 333/126 |
| 2006/0223368 | A1 * | 10/2006 | Hayashi | H01P 1/15 439/579 |
| 2007/0285187 | A1 | 12/2007 | Kawasaki | |
| 2008/0186108 | A1 * | 8/2008 | Miya | H03H 11/16 333/139 |
| 2010/0135192 | A1 * | 6/2010 | Kim | H01Q 3/30 370/280 |
| 2010/0150075 | A1 * | 6/2010 | Inoue | H03H 9/0576 370/328 |
| 2011/0140982 | A1 * | 6/2011 | Ozden | H01Q 1/242 343/852 |
| 2011/0158081 | A1 * | 6/2011 | Wang | H03F 1/304 370/201 |
| 2012/0083216 | A1 * | 4/2012 | Kenington | H04B 1/52 455/63.1 |
| 2012/0230227 | A1 * | 9/2012 | Weiss | H04B 1/52 370/277 |
| 2013/0163482 | A1 * | 6/2013 | Suzuki | H04B 1/0057 370/273 |

FOREIGN PATENT DOCUMENTS

| | | |
|---|---|---|
| JP | 2004-120295 A | 4/2004 |
| JP | 2005-109889 A | 4/2005 |
| JP | 2007-312221 A | 11/2007 |
| JP | 2010-16620 A | 1/2010 |
| WO | 00/28673 A1 | 5/2000 |

OTHER PUBLICATIONS

English translation of Official Communication issued in corresponding International Application PCT/JP2015/053466, dated Apr. 7, 2015.

English language translation of Meinke et al. "Taschenbuch der Hochfrequenztechnik", 4th edition, Springer-Verlag, 1986, ISBN 3-540-15393-4, 8 pages.

Official Communication issued in corresponding German Patent Application No. 11 2015 000 860.8 dated Jul. 28, 2017.

Meinke et al. "Taschenbuch der Hochfrequenztechnik", 4th edition, Springer-Verlag, 1986, ISBN 3-540-15393-4, 8 pages.

* cited by examiner

RADIO FREQUENCY FRONT-END CIRCUIT

CROSS REFERENCE TO RELATED APPLICATIONS

This application claims the benefit of priority to Japanese Patent Application 2014-029839 filed Feb. 19, 2014 and is a Continuation Application of PCT/JP2015/053466 filed on Feb. 9, 2015, the entire contents of each application are hereby incorporated herein by reference.

BACKGROUND OF THE INVENTION

1. Field of the Invention

The present invention relates to a radio frequency front-end circuit that transmits and receives radio frequency signals.

2. Description of the Related Art

A variety of radio frequency front-end circuits have been designed so far. One example of the radio frequency front-end circuits includes a duplexer that is a combination of a transmission filter and a reception filter, as disclosed in Japanese Unexamined Patent Application Publication No. 2004-120295.

In the duplexer, respective one ends of the transmission filter and the reception filter are connected to each other at a common terminal, and the common terminal is connected to an antenna or an antenna-side circuit. The other end of the transmission filter is connected to a transmission circuit, and the other end of the reception filter is connected to a reception circuit.

In the radio frequency front-end circuit of the above-described type, as a result of having a configuration in which the transmission filter and the reception filter are connected to each other, an impedance is set such that the circuit is opened at a fundamental frequency of a transmission signal when looking at the reception filter side from the transmission filter side, to prevent the transmission signal from coming into the reception filter side.

In the radio frequency front-end circuit of the related art, however, it is found that receiving sensitivity in the reception circuit connected to the reception filter degrades even in the case of trying to secure isolation between the transmission filter and the reception filter as described above.

SUMMARY OF THE INVENTION

Accordingly, preferred embodiments of the present invention provide a radio frequency front-end circuit capable of significantly reducing or preventing degradation of receiving sensitivity.

A preferred embodiment of the present invention provides a radio frequency front-end circuit including a duplexer circuit, a low noise amplifier, and a phase adjustment circuit. The duplexer circuit includes a transmission filter set such that a fundamental frequency band of a transmission signal falls within a pass band of the transmission filter, and a reception filter set such that a fundamental frequency band of a reception signal falls within a pass band of the reception filter. One end of the transmission filter and one end of the reception filter are connected to each other through a common junction. The low noise amplifier is connected to the other end of the reception filter. The phase adjustment circuit is connected between the reception filter and the low noise amplifier.

The phase adjustment circuit executes phase adjustment as follows. A Smith chart is divided into four quadrants by a first line representing pure resistance, and by a second line that interconnects points along an outer periphery of the Smith chart at each of which a phase is 90°, and a point of reference impedance. The phase adjustment executed by the phase adjustment circuit is set such that, at a particular frequency different from the fundamental frequency of the reception signal, a quadrant in which a phase of the low noise amplifier when looked at from the reception filter is present and a quadrant in which a phase when looking at the reception filter from the low noise amplifier is present are not in a conjugate relation.

With the features described above, impedance mismatch at the particular frequency different from the fundamental frequency of the reception signal is easily established between the reception filter and the low noise amplifier. As a result, noise within the particular frequency is prevented from being input to the low noise amplifier.

In a radio frequency front-end circuit according to a preferred embodiment of the present invention, preferably, the phase adjustment circuit executes the phase adjustment such that, at the particular frequency, the quadrant in which the phase of the low noise amplifier when looked at from the reception filter is present and the quadrant in which the phase when looking at the reception filter from the low noise amplifier is present are positioned on opposite sides of the second line.

With the feature described above, a degree of the impedance mismatch at the particular frequency is easily increased between the reception filter and the low noise amplifier.

In a radio frequency front-end circuit according to a preferred embodiment of the present invention, preferably, the phase adjustment circuit executes phase adjustment such that an impedance at the fundamental frequency of the reception signal is adjusted to come closer to the reference impedance.

With the feature described above, a transfer loss of the reception signal at the fundamental frequency is able to be further reduced while the impedance mismatch at the particular frequency is ensured.

A radio frequency front-end circuit according to a preferred embodiment of the present invention preferably includes a phase adjustment circuit including at least one surface-mount electronic component including a reactance component.

With the feature described above, the configuration of the phase adjustment circuit is able to be easily modified, and the impedance mismatch at the particular frequency between the reception filter and the low noise amplifier is able to be ensured with higher reliability.

A radio frequency front-end circuit according to a preferred embodiment of the present invention preferably includes a phase adjustment circuit that executes phase adjustment for a signal at the particular frequency based on a length of a transfer line through which the reception signal is transferred.

With the feature described above, the radio frequency front-end circuit is able to be implemented with a simple configuration while the impedance mismatch at the particular frequency between the reception filter and the low noise amplifier is reliably ensured.

A radio frequency front-end circuit according to a preferred embodiment of the present invention is preferably structure such that a reception signal defines a first communication band. A transmission signal defines a second communication band different from the first communication band. The transmission signal and the reception signal are communicated at the same time. The particular frequency is a fundamental frequency or a harmonic frequency of the transmission signal.

With the features described above, the transmission signal under simultaneous communication in accordance with Carrier Aggregation is able to be more reliably prevented from being input to the LNA (low noise amplifier). As a result, degradation of receiving sensitivity during the Carrier Aggregation is significantly reduced or prevented.

According to preferred embodiments of the present invention, it is possible to prevent a signal in a frequency band other than the fundamental frequency of the reception signal from being propagated to stages subsequent to the reception filter, and to significantly reduce or prevent degradation of the receiving sensitivity.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

Figure 1:
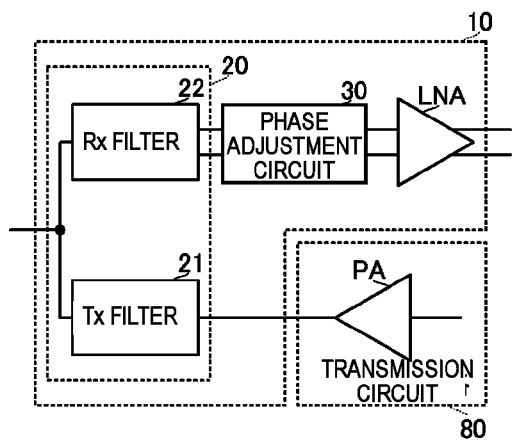
FIG. 1 is a block diagram of a radio frequency front-end circuit according to a first preferred embodiment of the present invention.

A radio frequency front-end circuit according to a first preferred embodiment of the present invention will be described below with reference to the drawings. FIG. 1 is a block diagram of the radio frequency front-end circuit according to the first preferred embodiment of the present invention.

As illustrated in FIG. 1, the radio frequency front-end circuit denoted by 10 includes a duplexer 20, a phase adjustment circuit 30, and a low noise amplifier LNA. The duplexer 20 includes a Tx filter 21 corresponding to a "transmission filter", and an Rx filter 22 corresponding to a "reception filter".

One end of the Tx filter 21 and one end of the Rx filter 22 are connected to each other at a common junction. The common junction is connected to an antenna or an antenna-side circuit (not illustrated). The antenna transmits a transmission signal having passed through the Tx filter 21 to the outside, and receives a reception signal from the outside.

The Tx filter 21 is set such that a fundamental frequency of the transmission signal falls within a pass band of the Tx filter 21. The Tx filter 21 is set to provide a predetermined attenuation for a frequency of the reception signal. The other end of the Tx filter 21 is connected to an output terminal of a power amplifier PA in a transmission circuit 80. Here, a matching circuit that performs impedance matching at the frequency of the transmission signal may be included between the power amplifier PA and the Tx filter 21.

The Rx filter 22 is set such that a fundamental frequency of the reception signal falls within a pass band of the Rx filter 22. The Rx filter 22 is set to provide a predetermined attenuation for the fundamental frequency of the transmission signal. The Rx filter 22 performs an unbalanced-balanced transforming function, and the other end of the Rx filter 22 defines a pair of balanced terminals. The other end of the Rx filter 22 is connected to an input terminal of the low noise amplifier LNA through the phase adjustment circuit 30. An output terminal of the low noise amplifier LNA is connected to a reception demodulation circuit (not illustrated).

Figure 2:
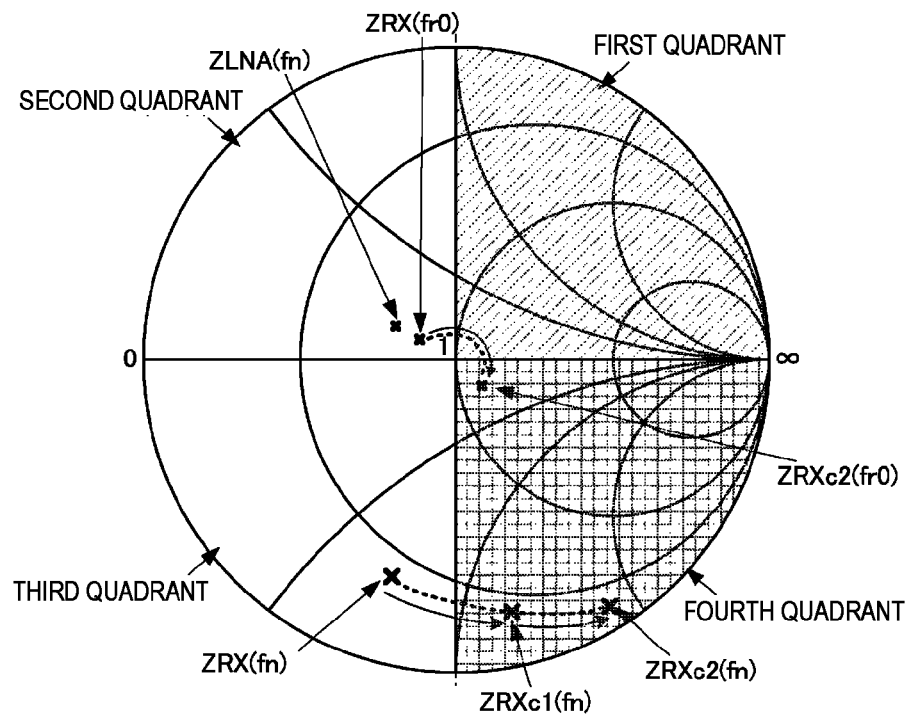
FIG. 2 depicts a Smith chart referred to in an explanation of a principle of the radio frequency front-end circuit according to the first preferred embodiment of the present invention.

The phase adjustment circuit 30 has a circuit configuration to perform impedance matching between the Rx filter 22 and the low noise amplifier LNA in a fundamental frequency band of the reception signal. The circuit configuration of the phase adjustment circuit 30 is realized on the basis of the principle described below. FIG. 2 depicts a Smith chart referred to in an explanation of a principle of the radio frequency front-end circuit according to the first preferred embodiment of the present invention.

In the radio frequency front-end circuit 10 according to a preferred embodiment of the present invention, as illustrated in FIG. 2, phase adjustment is performed by dividing the Smith chart into four quadrants described below, and by utilizing the property depending on in which one of the four quadrants impedance exists. It is to be noted that FIG. 2 illustrates the normalized Smith chart. Stated in another way, in FIG. 2, the Smith chart is illustrated such that an impedance of 100 Ω corresponds to impedance 1 in a pair of balanced lines.

A manner of dividing the Smith chart into the four quadrants is first described. A pure resistance line in the Smith chart, namely a line in FIG. 2 extending from a point of impedance 0, passing a point of impedance 1 (i.e., a point of reference impedance), and reaching a point of impedance ∞, is assumed to be a first line. Furthermore, a line passing two points along an outer periphery of the Smith chart at each of which a phase is 90°, and passing the point of impedance 1 (i.e., the point of reference impedance) is assumed to be a second line. Four regions divided by the first line and the second line orthogonal to each other are defined as first, second, third and fourth quadrants. The first quadrant is a region exhibiting inductive reactance and a large impedance. The second quadrant is a region exhibiting inductive reactance and a small impedance. The third quadrant is a region exhibiting capacitive reactance and a small impedance. The fourth quadrant is a region exhibiting capacitive reactance and a large impedance.

In FIG. 2, ZLNA(fn) represents an impedance at a particular frequency, which is different from the fundamental frequency of the reception signal and which becomes noise, in a state where the phase adjustment circuit 30 is not used, when looking at the low noise amplifier LNA side from the Rx filter 22. The term "particular frequency" means a frequency being different from the fundamental frequency of the reception signal and becoming noise that is received and amplified by the low noise amplifier LNA. ZRX(fn) represents an impedance at the particular frequency in the state where the phase adjustment circuit 30 is not used, when looking at the Rx filter 22 side from the low noise amplifier LNA. ZRXc1(fn) represents a first impedance at the particular frequency in the state where the phase adjustment circuit 30 is used, when looking at the Rx filter 22 side from the low noise amplifier LNA. ZRXc2(fn) represents a second impedance at the particular frequency in the state where the phase adjustment circuit 30 is used, when looking at the Rx filter 22 side from the low noise amplifier LNA. ZRX(fr0) represents an impedance at the fundamental frequency of the reception signal in the state where the phase adjustment circuit 30 is not used, when looking at the low noise amplifier LNA side from the Rx filter 22. ZRXc2(fr0) represents an impedance at the fundamental frequency of the reception signal in the state where the phase adjustment circuit 30 is used, when looking at the low noise amplifier LNA side from the Rx filter 22.

As illustrated in FIG. 2, when a phase of the impedance ZLNA(fn) at the particular frequency different from the fundamental frequency of the reception signal when looking at the low noise amplifier LNA side from the Rx filter 22 and a phase of the impedance ZRX(fn) at the particular frequency when looking at the Rx filter 22 side from the low noise amplifier LNA are present in the conjugate quadrants, the phase adjustment circuit 30 executes a phase shift. More specifically, the impedance ZRX(fn) is shifted to the quadrant that is not conjugate to the quadrant where the impedance ZLNA(fn) is present, as denoted by the impedance ZRXc1(fn) and the impedance ZRXc2(fn).

Thus, at the particular frequency different from the fundamental frequency of the reception signal, the low noise amplifier LNA and the Rx filter 22 are held in a state of impedance mismatch. Accordingly, noise at the particular frequency is not input to the low noise amplifier LNA from the Rx filter 22. As a result, the relevant noise is prevented, for example, from coming into the low noise amplifier LNA from the Tx filter 21, or from being reflected by the antenna and flowing into the low noise amplifier LNA through the Rx filter 22. Hence, the occurrence of degradation of the reception sensitivity is significantly reduced or prevented.

Moreover, as illustrated in FIG. 2, with the provision of the phase adjustment circuit 30, the impedance at the fundamental frequency of the reception signal is able to be adjusted to come closer to the reference impedance (100 Ω). As a result, a transfer loss of the reception signal is able to be further reduced, and the degradation of the reception sensitivity is able to be further reduced or prevented.

Figure 3:
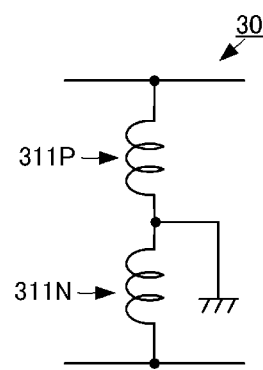
FIG. 3 is an equivalent circuit diagram illustrating one example of a phase adjustment circuit according to the first preferred embodiment of the present invention.

In order to execute the phase shift as described above, the phase adjustment circuit 30 has a circuit configuration illustrated in FIG. 3, for example. FIG. 3 is an equivalent circuit diagram illustrating one example of the phase adjustment circuit according to the first preferred embodiment of the present invention.

The phase adjustment circuit 30 includes inductors 311P and 311N. The inductor 311P is connected between a line electrode for one of the balanced lines, which connect the Rx filter 22 and the low noise amplifier LNA, and a ground. The inductor 311N is connected between a line electrode for the other of the balanced lines, which connect the Rx filter 22 and the low noise amplifier LNA, and the ground. Respective inductances of the inductors 311P and 311N are set to be able to execute a first or second phase shift illustrated in FIG. 2.

The inductors 311P and 311N may be each implemented with an electrode pattern provided on a substrate, or a surface-mount electronic component. When the inductors 311P and 311N are implemented with the electrode patterns, the phase adjustment circuit 30 is able to have a simple configuration, and the radio frequency front-end circuit 10 is able to be realized with a simple configuration. On the other hand, when the inductors 311P and 311N are implemented with the surface-mount electronic components, the inductances are able to be changed just by replacing the surface-mount electronic components, and inductance adjustment is facilitated. Accordingly, a desired amount of the phase shift is able to be obtained with higher accuracy.

Figure 4:
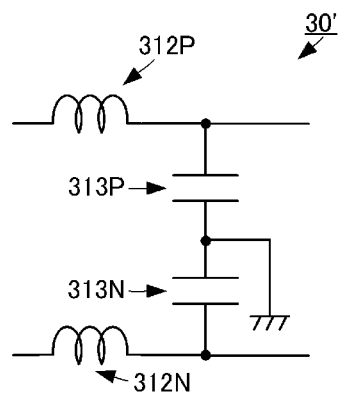
FIG. 4 is an equivalent circuit diagram illustrating another example of the phase adjustment circuit according to the first preferred embodiment of the present invention.

The phase adjustment circuit may have a circuit configuration described below. FIG. 4 is an equivalent circuit diagram illustrating another example of the phase adjustment circuit according to the first preferred embodiment of the present invention. A phase adjustment circuit 30' includes inductors 312P and 312N, and capacitors 313P and 313N.

The inductor 312P is connected in series at an intermediate position of the line electrode for one of the balanced lines that connect the Rx filter 22 and the low noise amplifier LNA. The capacitor 313P is connected between an end portion of the inductor 312P on the side closer to the low noise amplifier LNA and the ground.

The inductor 312N is connected in series at an intermediate position of the line electrode for the other of the balanced lines that connect the Rx filter 22 and the low noise amplifier LNA. The capacitor 313N is connected between an end portion of the inductor 312N on the side closer to the low noise amplifier LNA and the ground.

Figure 5:
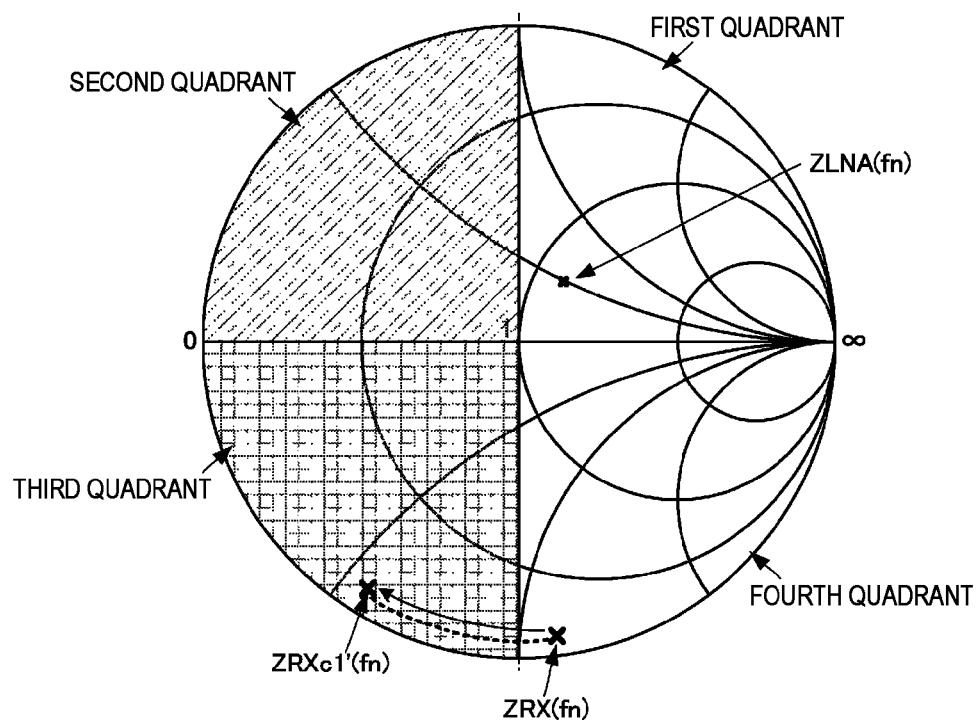
FIG. 5 depicts a Smith chart referred to in an explanation of a principle of another example of the radio frequency front-end circuit according to the first preferred embodiment of the present invention.

With the configuration described above, as illustrated in FIG. 5, a direction of the phase shift is opposite to that in the case of FIG. 2. FIG. 5 depicts a Smith chart referred to in an explanation of a principle of another example of the radio frequency front-end circuit according to the first preferred embodiment of the present invention. Also in this case, as illustrated in FIG. 5, when a phase of the impedance ZLNA(fn) at the particular frequency when looking at the low noise amplifier LNA side from the Rx filter 22 and a phase of the impedance ZRX(fn) at the particular frequency when looking at the Rx filter 22 side from the low noise amplifier LNA are present in the conjugate quadrants, the phase adjustment circuit 30' executes a phase shift. Thus, the impedance ZRX(fn) is shifted to the quadrant that is not conjugate to the quadrant where the impedance ZLNA(fn) is present, as denoted by an impedance ZRXc1'(fn).

With the above-mentioned phase shift, a degradation rate of the receiving sensitivity is able to be reduced in a similar manner.

Preferably, at the particular frequency different from the fundamental frequency of the reception signal, the phase of the impedance when looking at the low noise amplifier LNA side from the Rx filter 22 and the phase of the impedance when looking at the Rx filter 22 side from the low noise amplifier LNA are present in the quadrants that exist on the same side with respect to the pure resistance line (first line), and that exist on the opposite sides with respect to the second line. By holding both the phases in such a relation, a degree of the impedance mismatch between the Rx filter 22 and the low noise amplifier LNA at the particular frequency is able to be increased. As a result, crosstalk of noise to the low noise amplifier LNA is able to be reduced or prevented with higher reliability, and the degradation rate of the receiving sensitivity is able to be further reduced.

Figure 6:
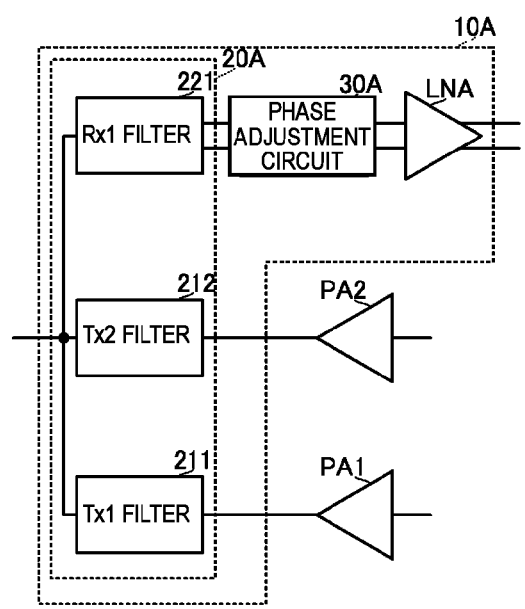
FIG. 6 is a block diagram of a radio frequency front-end circuit according to a second preferred embodiment of the present invention.

A radio frequency front-end circuit according to a second preferred embodiment of the present invention will be described below with reference to the drawings. FIG. 6 is a block diagram of the radio frequency front-end circuit according to the second preferred embodiment of the present invention. This preferred embodiment represents an example in which a second harmonic frequency of a second transmission signal and a fundamental frequency of a first reception signal are close to each other, and further represents the case of performing Carrier Aggregation in which transmission of the second transmission signal and reception of the first reception signal are carried out at the same time.

As illustrated in FIG. 6, the radio frequency front-end circuit of the second preferred embodiment preferably has a triplexer configuration instead of the duplexer configuration used in the first preferred embodiment.

As illustrated in FIG. 6, the radio frequency front-end circuit denoted by 10A includes a triplexer 20A, a phase adjustment circuit 30A, and a low noise amplifier LNA. The triplexer 20A includes a Tx1 filter 211 corresponding to a transmission filter in a "first communication band", a Tx2 filter 212 corresponding to a transmission filter in a "second communication band", and an Rx1 filter 221 corresponding to a reception filter in the "first communication band".

One end of the Tx1 filter 211, one end of the Tx2 filter 212, and one end of the Rx1 filter 221 are connected to one another. This junction is connected to an antenna or an antenna-side circuit (not illustrated). The antenna transmits a transmission signal having passed through the Tx1 filter 211 or the Tx2 filter 212 to the outside, and receives a reception signal from the outside.

The Tx1 filter 211 is set such that a fundamental frequency of a transmission signal in the first communication band falls within a pass band of the Tx1 filter 211. The Tx2 filter 212 is set such that a fundamental frequency of a transmission signal in the second communication band falls within a pass band of the Tx2 filter 212. The other end of the Tx1 filter 211 is connected to a power amplifier PA1. The other end of the Tx2 filter 212 is connected to a power amplifier PA2. Here, a matching circuit that performs impedance matching at the fundamental frequency of the transmission signal in corresponding one of the two communication bands may be disposed between the Tx1 filter 211 and the power amplifier PA1 or between the Tx2 filter 212 and the power amplifier PA2.

The Rx1 filter 221 is set such that a fundamental frequency of the reception signal in the first communication band falls within a pass band of the Rx1 filter 221. The Rx1 filter 221 is set to provide a predetermined attenuation for the fundamental frequency of each of the transmission signal in the first communication band and the transmission signal in the second communication band. The Rx1 filter 221 has the unbalanced-balanced transforming function. The other end of the Rx1 filter 221 is connected to the low noise amplifier LNA through the phase adjustment circuit 30A.

Figure 7:
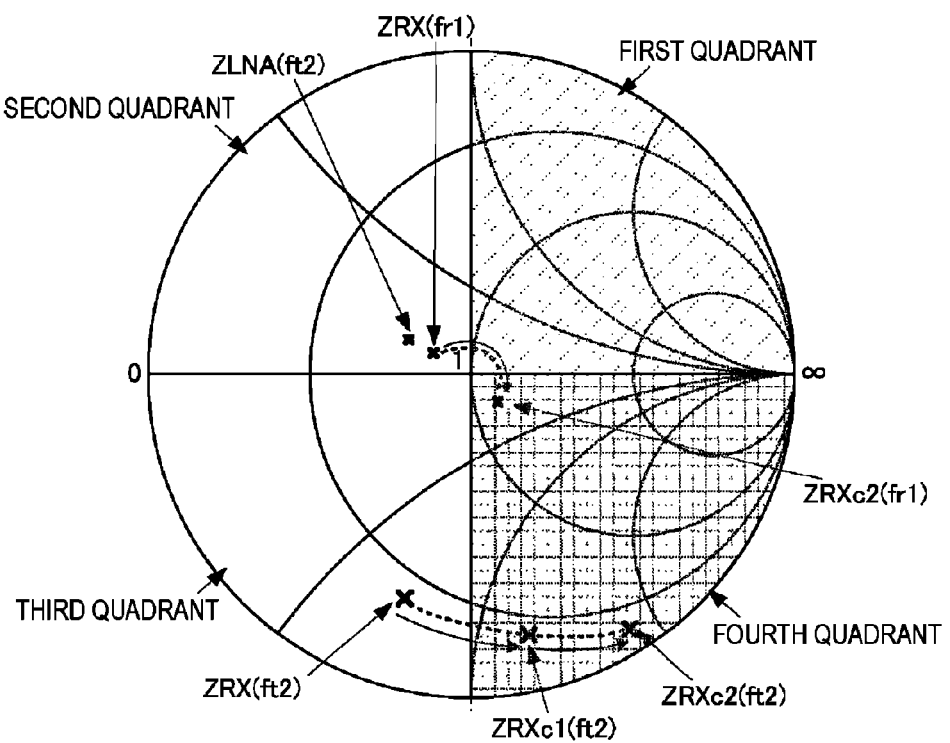
FIG. 7 depicts a Smith chart referred to in an explanation of a principle of the radio frequency front-end circuit according to the second preferred embodiment of the present invention.

The phase adjustment circuit 30A has a circuit configuration to perform impedance matching between the Rx1 filter 221 and the low noise amplifier LNA in a fundamental frequency band of the reception signal. The circuit configuration of the phase adjustment circuit 30A is realized on the basis of the principle described below. FIG. 7 depicts a Smith chart referred to in an explanation of a principle of the radio frequency front-end circuit according to the second preferred embodiment of the present invention. The Smith chart illustrated in FIG. 7 is similar to the Smith chart illustrated in FIG. 2, and it is divided into four quadrants in accordance with the same concept as that in FIG. 2.

In FIG. 7, ZLNA(ft2) represents an impedance at a second harmonic frequency of the transmission signal in the second communication band in a state where the phase adjustment circuit 30A is not used, when looking at the low noise amplifier LNA side from the Rx1 filter 221. ZRX(ft2) represents an impedance at the second harmonic frequency of the transmission signal in the second communication band in the state where the phase adjustment circuit 30A is not used, when looking at the Rx1 filter 221 side from the low noise amplifier LNA. ZRXc1(ft2) represents a first impedance at the second harmonic frequency of the transmission signal in the second communication band in the state where the phase adjustment circuit 30A is used, when looking at the Rx1 filter 221 side from the low noise amplifier LNA. ZRXc2 (ft2) represents a second impedance at the second harmonic frequency of the transmission signal in the second communication band in the state where the phase adjustment circuit 30A is used, when looking at the Rx1 filter 221 side from the low noise amplifier LNA. ZRX(fr1) represents an impedance at the fundamental frequency of the reception signal in the second communication band in the state where the phase adjustment circuit 30A is not used, when looking at the low noise amplifier LNA side from the Rx1 filter 221. ZRXc2(fr1) represents an impedance at the fundamental frequency of the reception signal in the second communication band in the state where the phase adjustment circuit 30A is used, when looking at the low noise amplifier LNA side from the Rx1 filter 221.

As illustrated in FIG. 7, when a phase of the impedance ZLNA(ft2) at the second harmonic frequency of the transmission signal in the second communication band when looking at the low noise amplifier LNA side from the Rx1 filter 221 and a phase of the impedance ZRX(ft2) at the second harmonic frequency of the transmission signal in the second communication band when looking at the Rx1 filter 221 side from the low noise amplifier LNA are present in the conjugate quadrants, the phase adjustment circuit 30A shifts the phase of the impedance ZRX(ft2). More specifically, the impedance ZRX(ft2) is shifted to the quadrant that is not conjugate to the quadrant where the impedance ZLNA(ft2) is present, as denoted by the impedance ZRXc1(ft2) and the impedance ZRXc2 (ft2).

Thus, at second harmonic frequency of the transmission signal in the second communication band, the Rx1 filter 221 and the low noise amplifier LNA are held in a state of impedance mismatch. Accordingly, a signal at the second harmonic frequency of the transmission signal in the second communication band is not input to the low noise amplifier LNA from the Rx1 filter 221. As a result, the signal at the second harmonic frequency of the transmission signal in the second communication band is prevented from flowing into the low noise amplifier LNA, and the degradation of the receiving sensitivity for the reception signal in the first communication band is able to be significantly reduced or prevented even in the case of performing the Carrier Aggregation.

Moreover, as illustrated in FIG. 7, with the provision of the phase adjustment circuit 30A, the impedance at the fundamental frequency of the reception signal in the first communication band is able to be adjusted to come closer to the reference impedance (100 Ω) of the balanced lines. Accordingly, a transfer loss of the reception signal in the first communication band is able to be further reduced, and the degradation of the reception sensitivity is able to be further reduced or prevented.

As described above, by using the configuration of this preferred embodiment, the degradation rate of the receiving sensitivity for the reception signal is significantly reduced even under the condition that the harmonic frequency of the transmission signal and the fundamental frequency of the reception signal are close to each other when the transmission signal and the reception signal are transmitted and received in accordance with the Carrier Aggregation.

While the above description has been made in connection with the case where the fundamental frequency of the reception signal in the first communication band and the second harmonic frequency of the transmission signal in the second communication band preferably are close to each other, similar advantageous effects to those in that case can also be obtained by using the above-described configuration when it is unavoidable that a radio frequency signal different from the fundamental frequency of the reception signal in the first communication band is input to the low noise amplifier LNA.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A radio frequency front-end circuit comprising:
a duplexer circuit including a transmission filter set such that a fundamental frequency band of a transmission signal falls within a pass band of the transmission filter, and a reception filter set such that a fundamental frequency band of a reception signal falls within a pass band of the reception filter, a first end of the transmission filter and a first end of the reception filter being connected to each other through a common junction;
a low noise amplifier connected to a second end of the reception filter; and
a phase adjustment circuit connected between the reception filter and the low noise amplifier; wherein
on a Smith chart that is divided into four quadrants by a first line representing pure resistance, and by a second line that interconnects points along an outer periphery of the Smith chart at each of which a phase is 90°, and a point of reference impedance, the phase adjustment circuit executes phase adjustment such that, at a particular frequency different from a fundamental frequency of the reception signal, a quadrant in which a phase of the low noise amplifier when looked at from the reception filter is present and a quadrant in which a phase when looking at the reception filter from the low noise amplifier is present are not in a conjugate relation and are positioned on opposite sides of the second line; and
the phase adjustment circuit includes a first inductor connected between a first line electrode of a first balanced line connecting the reception filter and the low noise amplifier, and a ground, and a second inductor connected between a second line electrode of a second balanced line connecting the reception filter and the low noise amplifier, and the ground.

2. The radio frequency front-end circuit according to claim 1, wherein each of the first inductor and the second inductor is defined by an electrode pattern on a substrate.

3. The radio frequency front-end circuit according to claim 1, wherein each of the first inductor and the second inductor is defined by a surface mount electronic component.

4. The radio frequency front-end circuit according to claim 1, further comprising a first capacitor connected to the first inductor, and a second capacitor connected to the second inductor.

5. A radio frequency front-end circuit comprising:
a triplexer circuit including a first transmission filter, a second transmission filter, and a reception filter, a first end of the first transmission filter, a first end of the second transmission filter, and a first end of the reception filter being connected to each other through a common junction;
a low noise amplifier; and
a phase adjustment circuit connected between the reception filter and the low noise amplifier; wherein
the first transmission filter passes a first transmission signal in a first communication band;
the reception filter passes a reception signal in the first communication band;
the second transmission filter passes a second transmission signal in a second communication band different from the first communication band;
transmission of the second transmission signal and reception of the first reception signal are carried out at the same time; and
on a Smith chart that is divided into four quadrants by a first line representing pure resistance, and by a second line that interconnects points along an outer periphery of the Smith chart at each of which a phase is 90°, and a point of reference impedance, the phase adjustment circuit executes phase adjustment such that, at a harmonic frequency of the second transmission signal, a quadrant in which a phase of the low noise amplifier when looked at from the reception filter is present and a quadrant in which a phase when looking at the reception filter from the low noise amplifier is present are not in a conjugate relation.

6. The radio frequency front-end circuit according to claim 5, wherein the phase adjustment circuit executes the phase adjustment such that an impedance at a fundamental frequency of the reception signal is adjusted to be closer to the reference impedance.

7. The radio frequency front-end circuit according to claim 5, wherein the phase adjustment circuit includes at least one surface-mount electronic component including a reactance component.

8. The radio frequency front-end circuit according to claim 5, wherein the phase adjustment circuit executes the phase adjustment for a signal at a particular frequency based on a length of a transfer line through which the reception signal is transferred.

9. The radio frequency front-end circuit according to claim 5, wherein the phase adjustment circuit performs impedance matching between the reception filter and the low noise amplifier.

10. The radio frequency front-end circuit according to claim 5, wherein at the harmonic frequency different from a fundamental frequency of the reception signal, the low noise amplifier and the reception filter are in a state of impedance mismatch.

11. The radio frequency front-end circuit according to claim 5, wherein the harmonic frequency is a second harmonic frequency.

12. The radio frequency front-end circuit according to claim 5, wherein the phase adjustment circuit executes phase adjustment such that, at a particular frequency, the quadrant in which the phase of the low noise amplifier when looked at from the reception filter is present and the quadrant in which the phase when looking at the reception filter from the low noise amplifier is present are on the same side with respect to the first line, and are on opposite sides with respect to the second line.

* * * * *